(12) United States Patent
Liu et al.

(10) Patent No.: US 11,343,586 B2
(45) Date of Patent: *May 24, 2022

(54) VIDEO OPTIMIZATION PROXY SYSTEM AND METHOD

(71) Applicant: AT&T Intellectual Property I, L.P., Atlanta, GA (US)

(72) Inventors: Zhengye Liu, Pleasanton, CA (US); Xidong Wu, San Ramon, CA (US); Jin Wang, Fremont, CA (US); Xiaojun Tang, Milpitas, CA (US); Mark Brady, Stanford, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,089

(22) Filed: Jul. 17, 2020

(65) Prior Publication Data

US 2020/0351567 A1 Nov. 5, 2020

Related U.S. Application Data

(63) Continuation of application No. 15/835,089, filed on Dec. 7, 2017, now Pat. No. 10,764,650.

(51) Int. Cl.
| | |
|---|---|
| *H04N 21/643* | (2011.01) |
| *H04N 21/234* | (2011.01) |
| *H04N 21/222* | (2011.01) |
| *H04N 21/2187* | (2011.01) |
| *H04N 21/2343* | (2011.01) |

(Continued)

(52) U.S. Cl.
CPC ....... *H04N 21/643* (2013.01); *H04N 21/2187* (2013.01); *H04N 21/222* (2013.01); *H04N 21/234* (2013.01); *H04N 21/23439* (2013.01); *H04N 21/26258* (2013.01);

(Continued)

(58) Field of Classification Search
CPC .......... H04N 21/643; H04N 21/23439; H04N 21/26258; H04N 21/64322; H04N 21/6587; H04N 21/8456; H04N 21/234; H04N 21/222; H04N 21/2187
See application file for complete search history.

(56) References Cited

U.S. PATENT DOCUMENTS 9,246,842 B2 1/2016 Papathanassiou et al.
9,379,990 B2 6/2016 Lamouchi et al.
(Continued)

*Primary Examiner* — Michael R Telan
(74) *Attorney, Agent, or Firm* — Guntin & Gust, PLC; Douglas Schnabel

(57) ABSTRACT

Aspects of the subject disclosure may include, for example, a machine-readable storage medium, including executable instructions that, when executed by a processing system including a processor, facilitate performance of operations that include assuming control of a video content transfer between a video server and a video client for HTTP traffic responsive to determining the HTTP traffic is for video content, generating a video transfer rate selection and a video transfer resolution selection for a requested video chunk of a time slot of the video content, generating an optimized manifest file for the requested video chunk, and publishing the optimized manifest file to the video client, wherein the video client request the requested video chunk from the video server based on the optimized manifest. Other embodiments are disclosed.

20 Claims, 7 Drawing Sheets

(51) Int. Cl.
*H04N 21/262* (2011.01)
*H04N 21/6587* (2011.01)
*H04N 21/845* (2011.01)

(52) U.S. Cl.
CPC ... *H04N 21/64322* (2013.01); *H04N 21/6587* (2013.01); *H04N 21/8456* (2013.01)

(56) References Cited

U.S. PATENT DOCUMENTS

| | | |
|---|---|---|
| 9,544,628 B2 | 1/2017 | Mack et al. |
| 9,712,887 B2 | 7/2017 | Myers et al. |
| 9,736,730 B2 | 8/2017 | Halepovic et al. |
| 9,762,635 B2 | 9/2017 | Sebastian et al. |
| 9,762,938 B2 | 9/2017 | Oyman |
| 9,781,077 B2 | 10/2017 | Mikhailov et al. |
| 2009/0031384 A1* | 1/2009 | Brooks .............. H04N 21/2405 725/127 |
| 2012/0265847 A1* | 10/2012 | Swenson .............. H04N 19/156 709/217 |
| 2013/0247147 A1* | 9/2013 | Pontillo ................. G06F 21/00 726/3 |
| 2014/0047071 A1 | 2/2014 | Shehada et al. |
| 2015/0350291 A1 | 12/2015 | Contreras Murillo et al. |
| 2015/0350708 A1* | 12/2015 | Pikes ................. H04N 21/2407 725/127 |
| 2015/0365450 A1* | 12/2015 | Gaunt ................ H04N 21/6371 709/231 |
| 2015/0381690 A1 | 12/2015 | Schmidt et al. |
| 2017/0013296 A1* | 1/2017 | Millar ................ H04N 21/2362 |
| 2017/0041238 A1* | 2/2017 | Do ......................... H04L 47/25 |
| 2017/0099507 A1 | 4/2017 | Tan |
| 2017/0171341 A1* | 6/2017 | Zane .................... H04N 21/222 |
| 2019/0182556 A1 | 6/2019 | Liu et al. |

* cited by examiner

100

VIDEO OPTIMIZATION PROXY SYSTEM AND METHOD

CROSS-REFERENCE TO RELATED APPLICATIONS

This application is a continuation U.S. patent application Ser. No. 15/835,089 filed Dec. 7, 2017, pending. All sections of the aforementioned application are incorporated herein by reference in their entirety.

FIELD OF THE DISCLOSURE

The subject disclosure relates to a video optimization proxy system and method.

BACKGROUND

Media content that is delivered by streaming services is typically performed via a Hypertext Transfer Protocol (HTTP). The user equipment requesting the media content includes the video optimization and encoding as part of the request.

BRIEF DESCRIPTION OF THE DRAWINGS

Reference will now be made to the accompanying drawings, which are not necessarily drawn to scale, and wherein.

DETAILED DESCRIPTION

Figure 1:
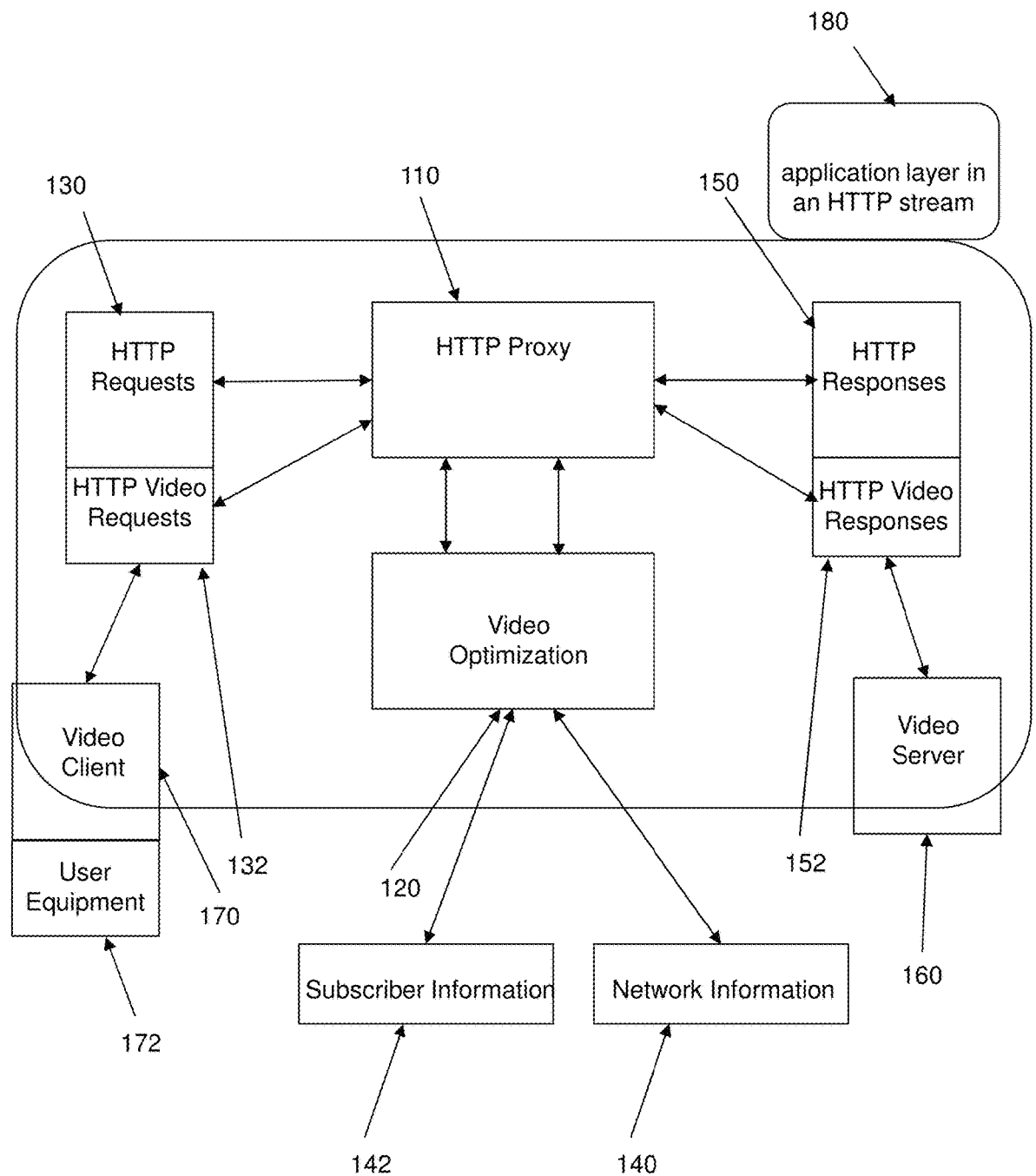
FIG. 1 depicts an illustrative embodiment of a flexible video optimization framework 100.

The subject disclosure describes, among other things, illustrative embodiments to provide a flexible video optimization framework that can work seamlessly on different network elements. Exemplarily, the same video optimization algorithms can run over different network elements based on different network design requirements. Exemplary embodiments of the invention can provide a generic and flexible video optimization framework, a video optimization proxy (VOP), on top of a traditional HTTP proxy. Other embodiments are described in the subject disclosure.

One or more aspects of the subject disclosure include a method including examining, by a processing system comprising a processor, HTTP traffic to determine if the HTTP traffic includes a request for video content from a video client of user equipment, assuming control, by the processing system, of a video content transfer between a video server and the video client for the HTTP traffic responsive to determining the HTTP traffic includes the request for the video content, requesting, by the processing system, manifest files of the video content from the video server responsive to the assuming control of the video content transfer, generating, by the processing system, a video transfer rate selection and a video transfer resolution selection for a time slot of the video content, transmitting, by the processing system, a request for video chunks from the video server according to the video transfer rate selection and the video transfer resolution selection for the time slot of the video content, receiving, by the processing system, requested video chunks from the video server for the time slot of the video content, and providing, by the processing system, the requested video chunks to the video client.

One or more aspects of the subject disclosure include a device that includes a processing system including a processor and a memory that stores executable instructions that, when executed by the processing system, facilitate performance of operations which include examining HTTP traffic to determine if the HTTP traffic includes a request for video content from a video client of user equipment, assuming control of a video content transfer between a video server and the video client for the HTTP traffic responsive to determining the HTTP traffic includes the request for the video content, generating manifest files of the video content from the video server responsive to the assuming control of the video content transfer based on an analysis of the request for video content, generating a video transfer rate selection and a video transfer resolution selection for the video content for a time slot of the video content, and generating an optimized manifest file for the time slot of the video content.

One or more aspects of the subject disclosure include a machine-readable storage medium, including executable instructions that, when executed by a processing system including a processor, facilitate performance of operations that include assuming control of a video content transfer between a video server and a video client for HTTP traffic responsive to determining the HTTP traffic includes a request for video content, generating a video transfer rate selection and a video transfer resolution selection for a requested video chunk of a time slot of the video content, generating an optimized manifest file for the requested video chunk, and publishing the optimized manifest file to the video client, wherein the video client request the requested video chunk from the video server based on the optimized manifest.

FIG. 1 provides an illustrative embodiment of a video optimization proxy (VOP) system 100 in which an HTTP proxy 110 performs video optimization through a video optimization module 120. Exemplarily, the HTTP proxy 110 receives video requests 132 from among all HTTP requests 130 on a network. The HTTP proxy 110 can analyze the HTTP video request 132 along with network information 140 and other relevant characteristics 142, such as account information or user equipment information, to perform an optimization of the video content stream between a video server 160 and a video client 170 at optimization module 120. The optimized video for the video request 132 can then be provided as an HTTP video response 152 to be placed en-route to the user equipment as part of HTTP responses 150.

Exemplarily, the video client 170 can be user equipment 172 such as a computing device, media processor, mobile device, or other communications device that requests video content from a video server 160 to be played on or stored on user equipment. The video client 170 can include applications or other software provided on the user equipment 172. In some embodiments, the video client 170 can be an over-the-top (OTT) video streaming service being employed in user equipment 172 such as a mobile device.

In some embodiments, video content from the video server 160 can be provided in chunks of video content based on a time slot in the video content stream to the video client 170 through the HTTP proxy 110. In other embodiments, the video content from the video server 160 can be provided in chunks of video content based on a time slot in the video content stream to the video client 170 through other HTTP resources while the HTTP proxy provides the address of the proper chunk of video content to the video client 170. In some embodiments, the video client uses the address provided by the HTTP proxy 110 to request the video chunk from the video server 160 with or without the further assistance of the VOP 100 or HTTP proxy 110. In some embodiments, the video server 160 can use the address provided by the HTTP proxy 110 to provide a video chunk according to the optimization with or without the further assistance of the VOP 100 or HTTP proxy 110.

Figure 2:
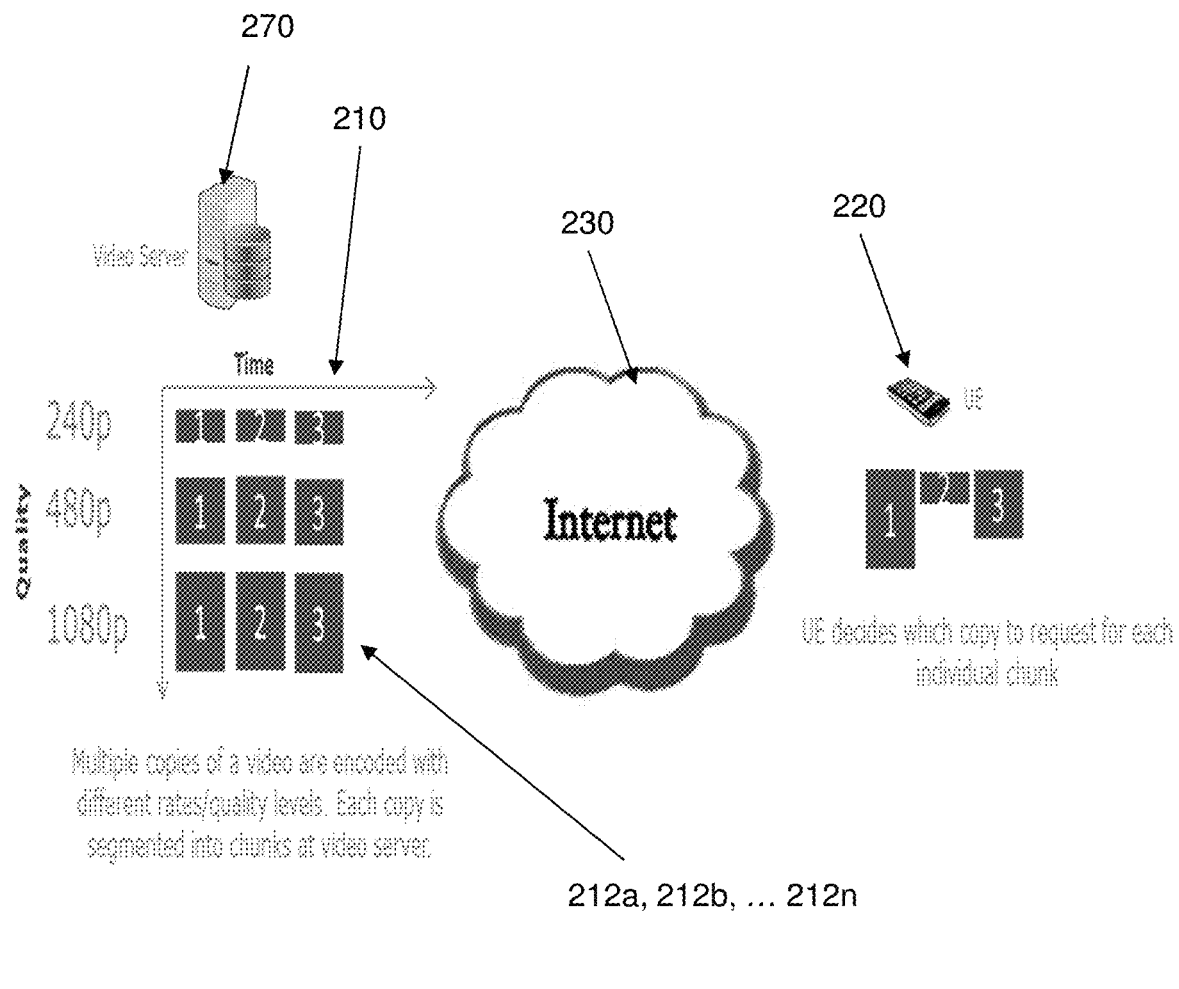
FIG. 2 depicts an illustrative embodiment of network system 200.

FIG. 2 depicts an illustrative network architecture 200 that conventionally delivers video chunks from a video server 270 to user equipment 220 based on requests from the user equipment. The user equipment may employ a video client to access and display the video content. Different network elements can have different network functionalities. Typically, for example, if a video optimization function is enabled and implemented by a user end device, the end user device is not easily aware of limitations to an access network. This limits a generic and flexible framework for video optimization as specific network element may change its functionality very fast during video delivery. In some instances, the network bandwidth may change, there may be errors to be accounted for, or the video content requested may simply be a wrong version. That is, the user device may not efficiently or properly generate a request for video content.

As illustrated in FIG. 2, multiple chunks of media content 210 are created. The user equipment 220 can then request which chunk 212a-212n of the chunks 210 over the Internet 230 are to be delivered. Each chunk of video content represents a certain portion of the video content or time slot for the video content. The chunks can be of different video transfer rates and/or video transfer resolutions for a time slot of the video content. As the user equipment 220 may decide on its own as to which chunk to request from the video server 270, the user equipment may not request an appropriate video chunk based on video optimization parameters, network parameters, or based on available video chunk capabilities. The video content is divided into the video chunks where each chunk can be of an appropriate length of time.

Returning to FIG. 1, a flexible video optimization framework according to embodiments of the invention can work seamlessly within or on different network elements. Exemplarily, video optimization algorithms can run over different network elements based on different network design requirements in the optimization module 120. In some embodiments, the exemplary video optimization proxy (VOP) 100 is provided on top of a traditional HTTP proxy layer 110. Exemplarily, the VOP 100 can be an added service layer at the application layer 180 in an HTTP stream. Exemplarily, by being virtual, the HTTP proxy 110 can be a flexible software module and can exemplarily be provided on-top of an HTTP proxy in the stream such as the application layer in HTTP stream 180.

As exemplarily illustrated in FIG. 1, the application layer in an HTTP stream 180, the video server 160, and the video client 170 can overlap with the VOP 100 or be separate therefrom. The HTTP proxy 110 can exemplarily be a software module that performs an HTTP proxy function rather than a standalone HTTP proxy box. Exemplarily, the software module representing the VOP 100 can be installed at different places, including at user equipment, an eNB, a standalone HTTP proxy, a CDN, or a video server. Exemplarily, video streaming can be optimized at certain specific elements as a virtual software module that can be installed easily and flexibly. The HTTP proxy 110 can be a SDN (software-defined-network) concept specifically designed for video optimization.

In one or more embodiments, the VOP 100 is exemplarily provided in a virtual manner so that it can locate at any network element if it has functionalities to reach application layer information. The VOP 100 can provide an application layer network control as a logic flow independent with the network elements that it operates with. Exemplarily, the VOP 100 can be fully software-based and with a proxy design pattern. In some embodiments, the VOP 100 can be easily and seamlessly added to a SDN-based network element.

As the VOP 100 can be based on an HTTP proxy, the VOP 100 can exemplarily exhibit the flexibility of HTTP proxies allowing it be located at different network elements in a network. Exemplarily, the VOP 100 can determine whether the HTTP traffic is of a video nature or a video format. For example, for the most popular HTTP video streaming formats, such as an HTTP live streaming (HLS) service and a Dynamic Adaptive Streaming over HTTP (MPEG DASH) service, this can be easily done by examining the uniform resource identifier (URI) of the manifest file/URI and video chunk URI. In most embodiments, all other video services can be supported by the VOP 100 as any time of video service can exemplarily use the VOP 100 for optimization regardless of video rate, video delay, and codec selection. Exemplarily, if an HTTP request is not requesting video chunks, it will not go through the video optimization module and may simply be delivered through the HTTP proxy.

Exemplarily, if an HTTP request 130 is requesting video chunks, it will go through the video optimization module 120 for optimization. For example, for a request related to HLS and/or MPEG DASH, the VOP 100 can, in one example, follow by using an HLS service. Thus, if an HLS video request is detected, in one example by detecting that the video client is requesting the HLS manifest file, such as a "m3u8" file (a UTF-8 Encoded Audio Playlist file which is a plain text file usable by both audio and video players to describe where media files are located), the request can be forwarded to the video optimization module 120.

In some embodiments, the video optimization module 120 can take over the entire video scheduling and requesting process. Thus, the video optimization module 120 in VOP 100 can generate the HTTP request to manifest the related files. After the VOP 100 receives or generates the manifest files, the VOP 100 can perform rate/resolution selection and video optimization algorithm. Exemplarily, the VOP 100 can request a manifest from the video server. In other embodiments, the VOP 100 can use machine learning based on an analysis of the HTTP traffic and the HTTP request to generate its own manifest. Based on the scheduling, the VOP 100 can send video chunk requests to video server 160.

In some embodiments, the rate and/or resolution selection can be made with or according to additional network information. For example, the rate and/or resolution can be determined based on the network factors, which is exemplarily illustrated as network information 140. In another embodiment, the rate and/or resolution can be determined based on subscriber information 142. The subscriber information can include information on the ability of user equipment 172 to handle or display video content. The subscriber information 142 can also include a subscription level of the user equipment 172 which may limit the video quality provided to the user equipment 172.

Exemplarily, based on video chunk requests from the VOP 100, a video server 160 can serve the requested video chunks according to the VOP 100 as illustrated by the HTTP video responses 152. In some embodiments, the VOP 100 receives a single resolution of video chunk for a provided time slot. This received chunk is optimal in a sense of a VOP optimization logic/algorithm provided in the video optimization module 120. Then, the VOP 100 can also behave as a video server and publish its own HLS manifest file to original video client. In some embodiments, this HLS manifest file can contain a single video resolution which is the actual scheduled and received video chunk by the VOP 100. In this example, the VOP 100 can overwrite an entire video scheduling algorithm by original video client.

Figure 3:
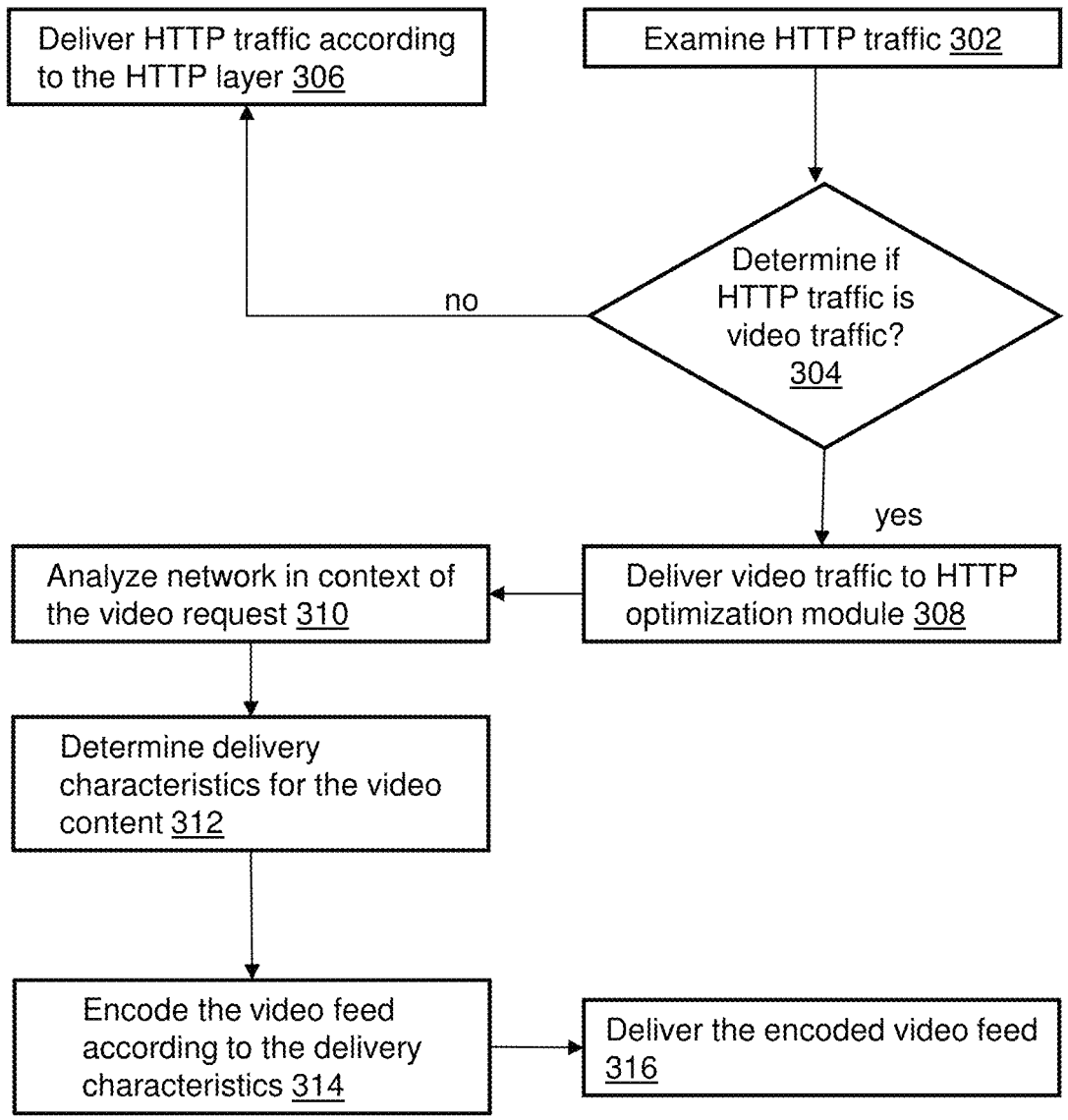
FIG. 3 depicts an illustrative embodiment of a method 300 used in portions of the system described in FIG. 1.

FIG. 3 illustrates an exemplary embodiment of method 300 for providing adaptive video content. Method 300 of FIG. 3 exemplarily includes step 302 in which HTTP traffic is examined by an HTTP video proxy. Exemplarily, the HTTP video proxy can be provided on an Internet traffic path of a video feed to the user equipment requesting video content at either one of the user equipment, the video feed source, or on top of the HTTP itself. Exemplarily, in step 304, the HTTP traffic can be determined to be related to video content. In some embodiments, a popular HTTP video streaming service, such as HLS and/or MPEG DASH, the URI of the manifest file (i.e., "/URI") or the video chunk URI is examined. The video chunk URI can be analyzed to determine that an HLS is requesting video content by a client device from a video server.

Exemplarily, in step 306, HTTP traffic that is determined to be non-video related can be delivered via the HTTP proxy. On the other hand, if step 304 determines that the traffic is video traffic, then the video traffic can be delivered to an exemplary optimization module in step 308, such as in FIG. 1 where the HTTP proxy 110 utilizes the optimization module 120. In some embodiments, the video optimization module 120 or VOP 100 can take over the entire requesting and scheduling process at this point. Exemplarily, the optimization module can request or prepare its own manifest files for the video content.

Exemplarily, in method 300, the network can be analyzed in step 310. Exemplarily, in step 312, the optimization can result in a video transfer rate selection and a video transfer resolution selection for the time slot of the video content. In some embodiments, the chunks can then be selected for that time slot according to the optimization. In other embodiments, in step 314, a request for video chunks is transmitted to the video server 160 according to the video transfer rate selection and the video transfer resolution selection for the time slot of the video content. In step 316, the encoded video content is delivered. In some embodiments, the video server 160 can exemplarily receive the information from the VOP 100 and either provide the video content chunks directly to the VOP 100. Upon receipt of the video content, the VOP 100 can provide the video content to the video client. In some embodiments, the video server 160 can, upon receiving the information from the VOP 100, transmit the encoded video content directly to the video client.

Figure 8:
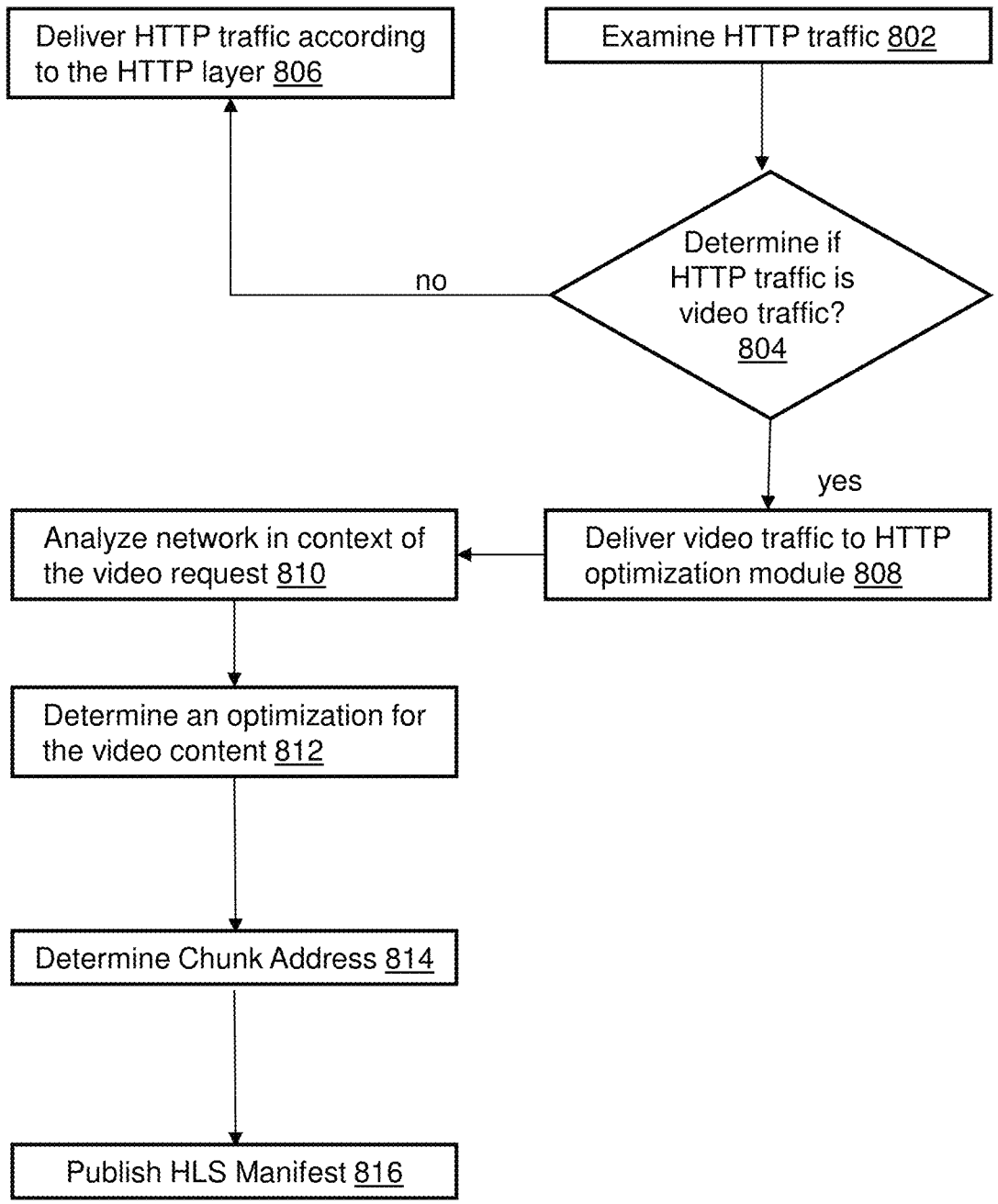
FIG. 8 depicts an illustrative embodiment of a method 300 used in portions of the system described in FIG. 1.

FIG. 8 illustrates an exemplary method 800 for delivering encoded video content to a client device. Similar to method 300, in step 802, HTTP traffic can be analyzed to determine if the HTTP traffic is video content or non-video content in step 804. In step 806, regular non-video traffic can proceed without engaging the VOP 100. In step 808, the video traffic can be transmitted to the video optimization module. In some embodiments, the video optimization module may only need be provided with information regarding the video traffic. This information can be the request from the video client 170 or video content received from the video server 160. At 810, the network can be analyzed in context of the video request. In step 812, the video content between the video server 160 and video client 170 can be analyzed and then optimized. Upon optimization, the appropriate chunk can be determined according to the optimization. At 814, chunk address(es) can be determined. In step 816, the optimizer 120 or the VOP 100 can publish an HLS manifest file to the original video client. In some embodiments, the newly created HLS manifest file can simply contain the single video resolution for that request.

While for purposes of simplicity of explanation, the respective processes are shown and described as a series of blocks in FIGS. 3 and 8, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
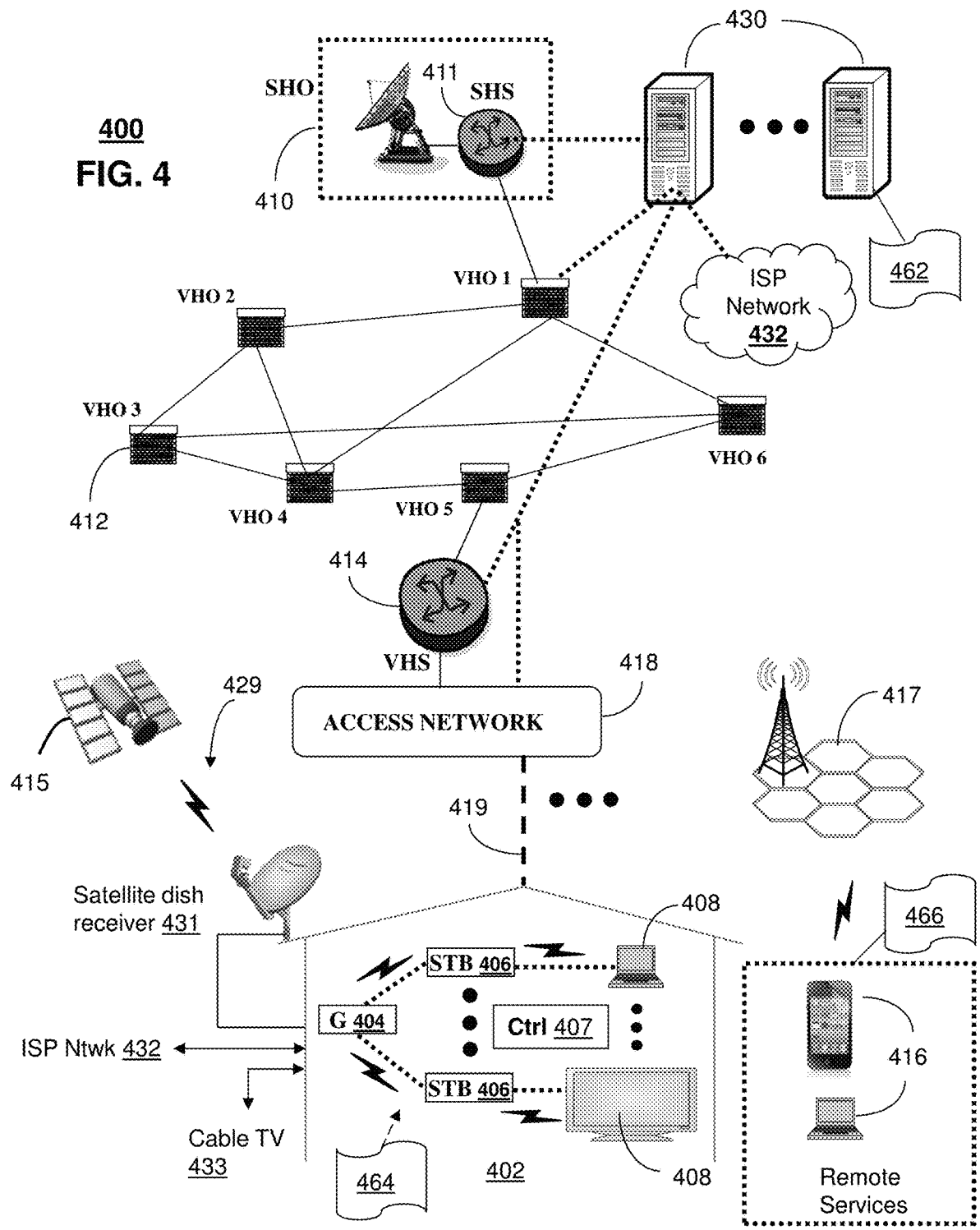
FIG. 4 depicts illustrative embodiments of a communication system that provide media services to the flexible video optimization framework 100 of FIG. 1 employing method 300 of FIG. 3.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with the VOP 100 of FIG. 1 as another representative embodiment of communication system 400. For instance, one or more devices illustrated in the communication system 400 of FIG. 4 can perform a method including examining, by a processing system comprising a processor, HTTP traffic to determine if the HTTP traffic is a request for video content from a video client of user equipment, assuming control, by the processing system, of a video content transfer between a video server and the video client for the HTTP traffic responsive to determining the HTTP traffic is for the video content, requesting, by the processing system, manifest files of the video content from the video server responsive to the assuming control of the video content transfer, generating, by the processing system, a video transfer rate selection and a video transfer resolution selection for a time slot of the video content, transmitting, by the processing system, a request for video chunks from the video server according to the video transfer rate selection and the video transfer resolution selection for the time slot of the video content, receiving, by the processing system, requested video chunks from the video server for the time slot of the video content, and providing, by the processing system, the requested video chunks to the video client.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a video optimization proxy (herein referred to as VOP 430). The VOP 430 can use computing and communication technology to perform a function 462, which can include among other things, the method of video optimization described in method 300 of FIG. 3 and method 800 of FIG. 8. For instance, function 462 of server 430 can be similar to the functions described for HTTP proxy 110 and video optimization module 120 of FIG. 1. The media processors 406 and wireless communication devices 416 can be provisioned with software functions 464 and 466, respectively, to utilize the services of VOP 430. For instance, software functions 464 and 466 of media processors 406 and wireless communication devices 416 can be similar to the functions described for the requesting client devices or user equipment 132 of FIG. 1.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
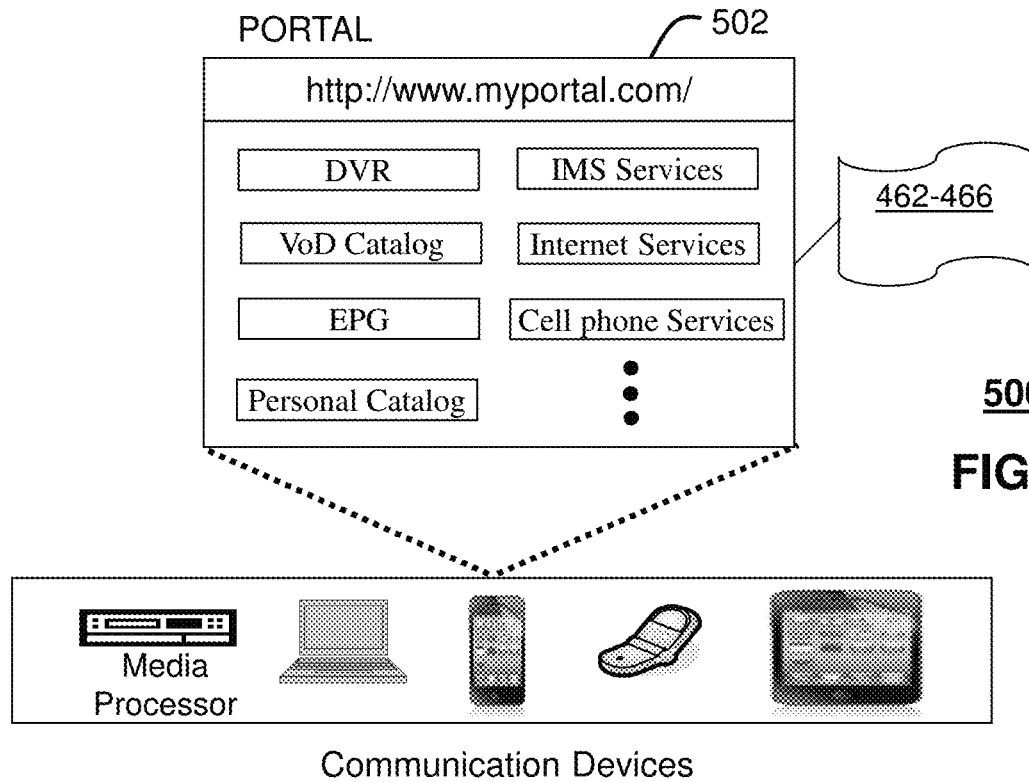
FIG. 5 depicts an illustrative embodiment of a web portal for interacting with the communication systems of the flexible video optimization framework 100 of FIG. 1 employing method 300 of FIG. 3 and the communication system of FIG. 4.

FIG. 5 depicts an illustrative embodiment of a web portal 502 of a communication system 500. Communication system 500 can be overlaid or operably coupled with VOP 100 of FIG. 1 and/or communication system 400 as another representative embodiment of VOP 100 of FIG. 1 and/or communication system 400. The web portal 502 can be used for managing services of the HTTP layer 110, video optimization module 120, and modules to detect subscriber information 142 and network information 140 of FIG. 1 and communication systems 400. A web page of the web portal 502 can be accessed by a Uniform Resource Locator (URL) with an Internet browser using an Internet-capable communication device such as those described in FIG. 1 and FIG. 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 462, 464, and 466 to adapt these applications as may be desired by subscribers and/or service providers of VOP 100 of FIG. 1 and communication system 400. For instance, users of the user equipment can log into their on-line accounts and provision the servers 110 or server 430 with a video request for an OTT video service as the HTTP video request 132 of FIG. 1, and so on. Service providers can log onto an administrator account to provision, monitor and/or maintain the optimization module 120 or VOP 430 of FIGS. 1 and 4, respectively.

Figure 6:
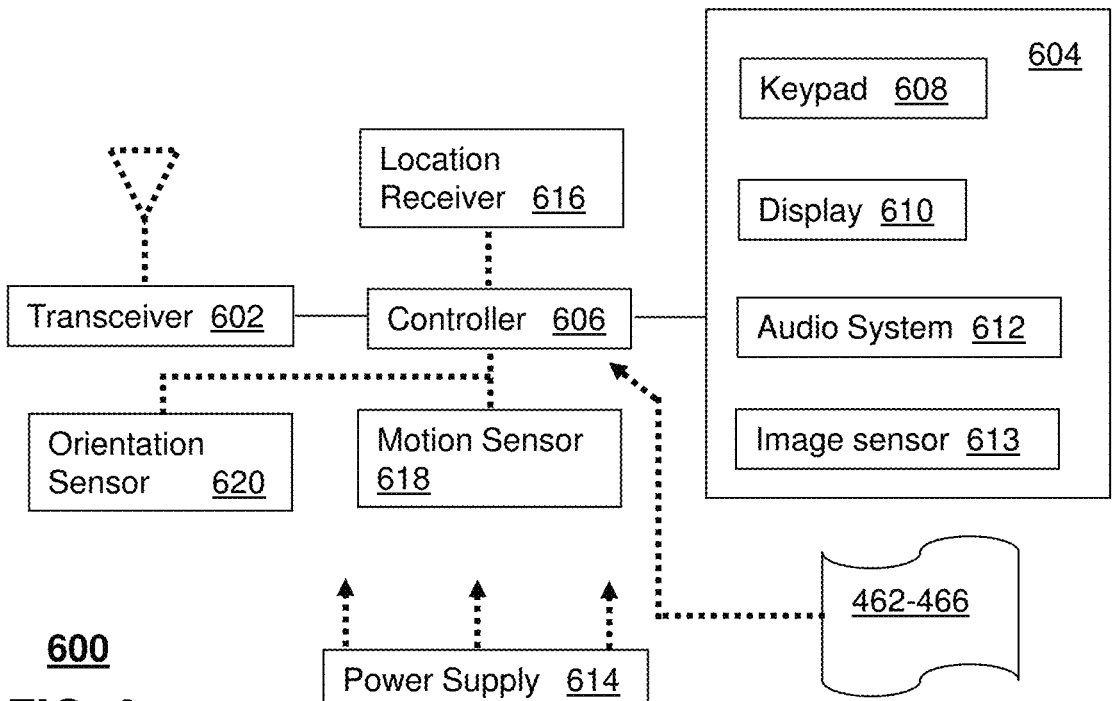
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIG. 1 and FIG. 4 and can be configured to perform portions of method 300 of FIG. 3 and method 800 of FIG. 8.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of the video requestor 132 of FIG. 1, the media processor 406, the media devices 408, or the portable communication devices 416 of FIG. 4. It will be appreciated that the communication device 600 can also represent other devices that can operate in system 100 of FIG. 1 and communication system 400 of FIG. 4 such as a gaming console and a media player. In addition, the controller 606 can be adapted in various embodiments to perform the functions software functions 462, 464, and 466, respectively.

Upon reviewing the aforementioned embodiments, it would be evident to an artisan with ordinary skill in the art that said embodiments can be modified, reduced, or enhanced without departing from the scope of the claims described below. For example, the video optimization proxy can be provided at various locations in the network between a video server and a video client. In some embodiments, traffic other than video content can be searched for an optimized. In some embodiments, this can include audio or other forms of streaming data. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
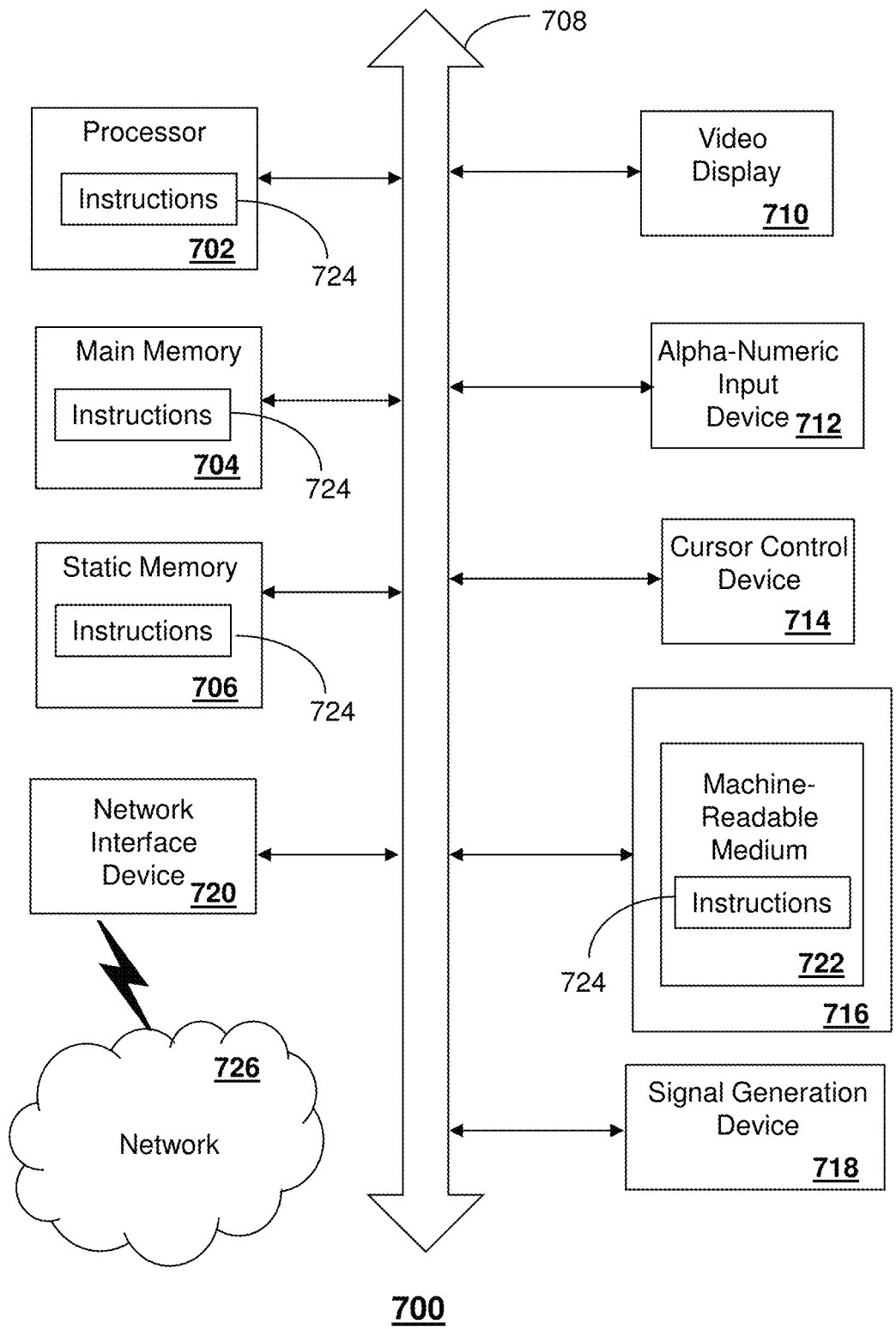
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the VOP 430, the media processor 406, the optimization module 120, the HTTP layer 110, VOP 100, and other devices of FIGS. 1, 2, and 4. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and/or HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
receiving, by a processing system comprising a processor, over a network from user equipment, Hypertext Transfer Protocol (HTTP) traffic in an HTTP stream;
detecting, by the processing system operating at a network element that is independent of the user equipment and in remote data communication with the user equipment over the network, a request in the HTTP traffic for a video content from a video client of the user equipment;
delivering, by the processing system, the HTTP traffic to a destination over the network responsive to determining the HTTP traffic does not include the request from the video client for the video content;
assuming control, by the processing system, of a video content transfer between a video server and the video client for the HTTP traffic responsive to determining the HTTP traffic comprises the request from the video client for the video content;
analyzing, by the processing system at the network element, the network in context of the request from the video client for a video content to determine network factors;
generating, by the processing system at the network element, a video transfer rate selection and a video transfer resolution selection for a time slot of the video content, wherein the generating the video transfer rate selection and the video transfer resolution selection comprise selecting a video transfer rate or a video transfer resolution, or a combination of both, based on the network factors and an ability of the user equipment to display video content to optimize the video content transfer over the network to the user equipment;
transmitting to the video server, by the processing system at the network element, a request for video chunks from the video server, wherein the request for video chunks is according to the video transfer rate selection for the time slot of the video content and the video transfer resolution selection for the time slot of the video content;
receiving, by the processing system at the network element, requested video chunks from the video server for the time slot of the video content responsive to the request for the video chunks; and
providing, by the processing system at the network element, over the network, the requested video chunks to the video client of the user equipment, including publishing, by the processing system at the network element, an optimized manifest file to the video client, wherein the optimized manifest file contains the selected video transfer rate or the selected video transfer resolution for the time slot of the video content, or a combination of both.

2. The method of claim 1, wherein the video content transfer is via an HTTP live streaming service, wherein the network element comprises a software defined network element.

3. The method of claim 1, further comprising:
generating, by the processing system, the optimized manifest file for the requested video chunks; and
inspecting a uniform resource identifier of a manifest file of a video chunk of the video content from the video server.

4. The method of claim 3, wherein the publishing the optimized manifest file to the video client replaces the request from the video client for the video content with the optimized manifest file for the user equipment for the video content at the time slot.

5. The method of claim 1, further comprising determining network conditions, wherein the generating the video transfer rate selection and the video transfer resolution selection for the time slot comprises generating the video transfer rate selection and the video transfer resolution selection for the time slot based on the user equipment and the network conditions between the user equipment and the processing system.

6. The method of claim 5, further comprising determining a subscription status between the video client and the video server, wherein the generating the video transfer rate selection and the video transfer resolution selection for the time slot is further based on the subscription status.

7. The method of claim 5, further comprising determining a resolution capability of the user equipment, wherein the generating the video transfer rate selection and the video transfer resolution selection for the time slot is further based on the resolution capability of the user equipment.

8. The method of claim 1, wherein the request from the video client for the video content comprises an HTTP live streaming service.

9. The method of claim 1, further comprising, responsive to determining that the HTTP traffic does not comprise a request for a video content, ignoring, by the processing system, the HTTP traffic.

10. The method of claim 1, wherein receiving the HTTP traffic comprises receiving the HTTP traffic via an HTTP proxy layer.

11. The method of claim 1, further comprising inspecting a uniform resource identifier address file of a requested video content being requested by the video client.

12. A device, comprising:
a processing system including a processor; and
a memory that stores executable instructions that, when executed by the processing system, facilitate performance of operations, comprising:
assuming control of a video content transfer over a network between a video server and a video client of user equipment for Hypertext Transfer Protocol (HTTP) traffic in an HTTP stream responsive to determining that the HTTP traffic comprises a request for a video content from the video client of user equipment via an HTTP proxy layer;
analyzing the network in context of the request from the video client of the user equipment for a video content to determine network factors;
generating a video transfer rate selection and a video transfer resolution selection for the video content for a time slot of the video content, including selecting a video transfer rate or a video transfer resolution, or a combination of both, based the network factors and an ability of the user equipment to display video content in order to optimize the video content transfer;
transmitting to the video server a request for video chunks from the video server, wherein the request for video chunks is according to the video transfer rate selection for the time slot of the video content and the video transfer resolution selection for the time slot of the video content;
receiving requested video chunks from the video server for the time slot of the video content responsive to the request for the video chunks, the requested video chunks being associated with the video transfer rate selection for the time slot of the video content and the video transfer resolution selection for the time slot of the video content; and generating an optimized manifest file for the time slot of the video content, wherein the generating the optimized manifest file comprises generating the optimized manifest file with the selected video transfer rate or the selected video transfer resolution, or a combination of both.

13. The device of claim 12, wherein the operations further comprise inspecting a uniform resource identifier of a manifest file of a video chunk of the video content from the video server.

14. The device of claim 12, wherein the operations further comprise transferring the optimized manifest file to the video client of the user equipment.

15. The device of claim 12, wherein the operations further comprise determining network conditions between the user equipment and the processing system, wherein the generating the video transfer rate selection and the video transfer resolution selection for the time slot is based on the user equipment and the network conditions between the user equipment and the processing system.

16. The device of claim 15, wherein the operations further comprise determining a subscription status between the video client and the video server, wherein the generating the video transfer rate selection and the video transfer resolution selection for the time slot is further based on the subscription status.

17. The device of claim 15, wherein the operations further comprise publishing the optimized manifest file to the video client to replace a request for video content from the video client via the HTTP proxy layer with the optimized manifest file for the user equipment for the video content at the time slot.

18. A non-transitory, machine-readable storage medium, comprising executable instructions that, when executed by a processing system including a processor, facilitate performance of operations, comprising:

examining, by a video optimization proxy, Hypertext Transfer Protocol (HTTP) traffic in an HTTP stream to identify a request for video content;

assuming control, by a video optimization proxy, of a video content transfer over a network between a video server and a video client of user equipment for the HTTP traffic in the HTTP stream via an HTTP proxy layer responsive to determining the HTTP traffic comprises the request for video content, and wherein the processing system operates to implement the HTTP proxy layer and the video optimization proxy together at a network element that is located remotely from and is in communication over the network with the user equipment;

analyzing the network in context of the request for video content to determine network factors;

generating, by the video optimization proxy, a video transfer rate selection and a video transfer resolution selection for a requested video chunk of a time slot of the video content, including selecting a video transfer rate or a video transfer resolution, or a combination of both, based on the network factors in order to optimize the video content transfer to the video client of the user equipment;

transmitting, by the video optimization proxy, to the video server a request for video chunks from the video server, wherein the request for video chunks is according to the video transfer rate selection for the time slot of the video content and the video transfer resolution selection for the time slot of the video content;

receiving, by the video optimization proxy, requested video chunks from the video server for the time slot of the video content responsive to the request for the video chunks, the requested video chunks being associated with the video transfer rate selection for the time slot of the video content and the video transfer resolution selection for the time slot of the video content;

generating, by the video optimization proxy, an optimized manifest file for the requested video chunk wherein the generating the optimized manifest file comprises generating the manifest optimized file based on the requested video chunks associated with the selected video transfer rate or the selected video transfer resolution, or a combination of both; and publishing, by the video optimization proxy, the optimized manifest file to the video client, wherein the video client requests the requested video chunk from the video server based on the optimized manifest file.

19. The non-transitory, machine-readable storage medium of claim 18, further comprising analyzing the requested video chunk.

20. The non-transitory, machine-readable storage medium of claim 18, wherein the publishing the optimized manifest file to the video client replaces a request from the video client with the optimized manifest file for the video content at the time slot.

* * * * *